United States Patent
Toyoda (10) Patent No.: US 8,285,041 B2
(45) Date of Patent: Oct. 9, 2012

(54) IMAGE PROCESSING APPARATUS, IMAGE RECORDING APPARATUS, AND IMAGE PROCESSING METHOD

(75) Inventor: Tetsuya Toyoda, Hachioji (JP)

(73) Assignee: Olympus Corporation, Tokyo (JP)

( * ) Notice: Subject to any disclaimer, the term of this patent is extended or adjusted under 35 U.S.C. 154(b) by 1111 days.

(21) Appl. No.: 11/221,264

(22) Filed: Sep. 7, 2005

(65) Prior Publication Data

US 2006/0056688 A1      Mar. 16, 2006

(30) Foreign Application Priority Data

Sep. 14, 2004  (JP) ................................. 2004-267072
Oct. 19, 2004  (JP) ................................. 2004-304785

(51) Int. Cl.
*G06K 9/00* (2006.01)
(52) U.S. Cl. ........ 382/168; 382/169; 382/254; 382/274; 348/645; 348/649; 348/687; 345/589; 345/601
(58) Field of Classification Search ........... 382/168–169
See application file for complete search history.

(56) References Cited

U.S. PATENT DOCUMENTS

| | | | | |
|---|---|---|---|---|
| 5,241,386 | A * | 8/1993 | Tsuji et al. | 348/607 |
| 5,359,369 | A * | 10/1994 | Izawa et al. | 348/672 |
| 6,570,611 | B1 | 5/2003 | Satou | |
| 2002/0080247 | A1* | 6/2002 | Takahashi et al. | 348/229 |
| 2002/0110277 | A1* | 8/2002 | Ono et al. | 382/168 |
| 2003/0099407 | A1* | 5/2003 | Matsushima | 382/274 |
| 2003/0161549 | A1* | 8/2003 | Lei et al. | 382/274 |
| 2003/0197879 | A1* | 10/2003 | Terashita | 358/1.9 |
| 2004/0091139 | A1* | 5/2004 | Urushiya | 382/132 |
| 2004/0247196 | A1* | 12/2004 | Chanas et al. | 382/254 |

FOREIGN PATENT DOCUMENTS

| | | |
|---|---|---|
| CN | 1065566 | 10/1992 |
| CN | 1129889 | 12/2003 |
| JP | 2000-188768 | 7/2000 |
| JP | 2002-232728 | 8/2002 |
| JP | 2003-046848 | 2/2003 |
| JP | 2003-46859 | 2/2003 |
| JP | 2003-179809 | 6/2003 |
| JP | 2003-234955 | 8/2003 |

OTHER PUBLICATIONS

Chinese Office Action for Patent Application No. 200510103114X, dated May 11, 2007 (7 pgs.) with translation (7 pgs.).
Chinese Office Action for Patent Application No. 200510112886X, dated May 25, 2007 (7 pgs.) with translation (6 pgs.).
Notice of Reasons for Rejection of Japanese Patent Application No. 2004-267072, mailed May 12, 2009 (3 pgs.) with translation (3 pgs.).
Notice of Reasons for Rejection of Japanese Patent Application No. 2004-304785, mailed May 12, 2009 (3 pgs.) with translation (3 pgs.).

* cited by examiner

Primary Examiner — John Lee
(74) Attorney, Agent, or Firm — Straub & Pokotylo; John C. Pokotylo (57) ABSTRACT

An image processing apparatus includes a histogram computing section which computes a histogram of pixel values of input image data. A gradation conversion characteristic determining section determines a gradation conversion characteristic in a case where gradation conversion processing is applied to the image data on the basis of the histogram computed by the histogram computing section, and photographing information when the image data has been picked up. A gradation converting section converts the gradation of the input image data on the basis of the gradation conversion characteristic determined by the gradation conversion characteristic determining section.

18 Claims, 8 Drawing Sheets

| Scene mode | Gradation conversion table | |
|---|---|---|
| | Default gradation conversion table | Accumulated histogram |
| Normal | 0.5 | 0.5 |
| Landscape | 0.2 | 0.8 |
| Person | 0.7 | 0.3 |
| Night view | 0.8 | 0.2 |

FIG. 5

Frequency distribution (solid line)

Frequency value limitation level (broken line)

Input value

| | | Flash ON | | Flash OFF | |
|---|---|---|---|---|---|
| | | Default gradation conversion table | Accumulated histogram | Default gradation conversion table | Accumulated histogram |
| BV low | Low sensitivity | 0.0 | 1.0 | 0.5 | 0.5 |
| | High sensitivity | 0.3 | 0.7 | 0.8 | 0.2 |
| BV middle | Low sensitivity | 0.3 | 0.7 | 0.3 | 0.7 |
| | High sensitivity | 0.6 | 0.4 | 0.6 | 0.4 |
| BV high | Low sensitivity | 0.5 | 0.5 | 0.0 | 1.0 |
| | High sensitivity | 0.8 | 0.2 | 0.3 | 0.7 |

FIG. 13B

| | | Flash ON | | Flash OFF | |
|---|---|---|---|---|---|
| | | Default gradation conversion table | Accumulated histogram | Default gradation conversion table | Accumulated histogram |
| BV low | Low sensitivity | 1.0 | 0.0 | 1.0 | 0.0 |
| | High sensitivity | 1.0 | 0.0 | 1.0 | 0.0 |
| BV middle | Low sensitivity | 1.0 | 0.0 | 1.0 | 0.0 |
| | High sensitivity | 1.0 | 0.0 | 1.0 | 0.0 |
| BV high | Low sensitivity | 1.0 | 0.0 | 1.0 | 0.0 |
| | High sensitivity | 1.0 | 0.0 | 1.0 | 0.0 |

|  | Flash ON | Flash OFF |
|---|---|---|
| BV low | $\gamma$ low | $\gamma$ high |
| BV middle | $\gamma$ middle | $\gamma$ middle |
| BV high | $\gamma$ middle | $\gamma$ low |

F I G. 14 A

|  | Flash ON | Flash OFF |
|---|---|---|
| BV low | $\gamma$ middle | $\gamma$ middle |
| BV middle | $\gamma$ middle | $\gamma$ middle |
| BV high | $\gamma$ middle | $\gamma$ middle |

F I G. 14 B

F I G. 15

IMAGE PROCESSING APPARATUS, IMAGE RECORDING APPARATUS, AND IMAGE PROCESSING METHOD

CROSS-REFERENCE TO RELATED APPLICATIONS

This application is based upon and claims the benefit of priority from prior Japanese Patent Applications No. 2004-267072, filed Sep. 14, 2004; and No. 2004-304785, filed Oct. 19, 2004, the entire contents of both of which are incorporated herein by reference.

BACKGROUND OF THE INVENTION

1. Field of the Invention

The present invention relates to an image processing apparatus, an image recording apparatus and an image processing method, and more particularly, it relates to an image processing apparatus, an image recording apparatus and an image processing method each of which adaptively applies gradation conversion processing to an image.

2. Description of the Related Art

The gradation of an image is one of the important factors that determine the quality of the image. In general, the signal output from an image pickup device is substantially in proportion to the quantity of light entering in the image pickup device. In a subsequent image process, the output signal from the image pickup device is subjected to some gradation conversion process in accordance with the final image observation environment (e.g., image observation on a monitor, image observation on a printout, or the like). For example, in the case of a general digital camera, the sRGB color space is adopted as the standard color space of the image file format, and the gradation of an image picked up by the digital camera is designed so that the optimum gradation can be obtained when the image is displayed on a monitor having a gamma characteristic according to the sRGB provision ($\gamma=2.2$).

Usually, the gradation conversion characteristic of an image is generally fixed to one kind for each input device such as a digital camera, or selected by a user or the like among a plurality of gradation conversion characteristics. Further, in recent years, techniques have been tried to be used for adaptively optimizing the gradation conversion characteristic for each image in accordance with the brightness distribution in the image (or the scene). This is because the dynamic range of subject field varies from scene to scene. If the gradation of an image is converted by a uniform gradation conversion characteristic without considering the variation of the dynamic range, it is difficult for the brightness information of the subject field to be efficiently reflected on the dynamic range of an output device such as a monitor or a printer.

As one of the techniques for adaptively optimizing the gradation conversion characteristic for each image, a histogram equalization method is known. This is a technique in which the quantity of brightness information of an image is increased by applying a gradation conversion such that the brightness histogram of the image (the frequency values of brightness gradation levels) is made even, and thereby the gradation is efficiently allotted to the output device.

However, if such a gradation conversion is uniformly applied irrespective of the image pickup conditions and the scene, there may be a case where the gradation is converted undesirably for a certain image (scene), for example, the noise of a dark portion is amplified to exceed its permissible level.

As an example of a measure to solve the above problem, in a technique proposed in JP-A-2003-179809, the brightness distribution of an image is detected. From the detected brightness distribution, it is judged whether or not the brightness distribution needs correction. When the brightness distribution is judged to need correction, the brightness distribution is corrected so as to be made even, and thereby the degradation of the output image is prevented.

BRIEF SUMMARY OF THE INVENTION

According to a first aspect of the present invention, there is provided an image processing apparatus comprising:

a histogram computing section which computes a histogram of pixel values of input image data;

a gradation conversion characteristic determining section which determines a gradation conversion characteristic in a case where gradation conversion processing is applied to the image data, on the basis of the histogram computed by the histogram computing section and photographing information when the image data has been picked up; and a gradation converting section which converts the gradation of the image data on the basis of the gradation conversion characteristic determined by the gradation conversion characteristic determining section.

According to a second aspect of the present invention, there is provided an image recording apparatus comprising:

an image pickup section which picks up an image of a subject field to obtain image data;

a histogram computing section which computes a histogram of pixel values of the image data obtained by the image pickup section;

a gradation conversion characteristic determining section which determines a gradation conversion characteristic in a case where gradation conversion processing is applied to the image data, on the basis of the histogram computed by the histogram computing section and photographing information when the image data has been picked up;

a gradation converting section which converts the gradation of the input image data on the basis of the gradation conversion characteristic determined by the gradation conversion characteristic determining section; and a recording section which records on a recording medium the image data converted in gradation by the gradation converting section.

According to a third aspect of the present invention, there is provided an image processing method comprising:

computing a histogram of pixel values of input image data;

determining a gradation conversion characteristic in a case where gradation conversion processing is applied to the image data on the basis of the computed histogram, and photographing information when the image data has been picked up; and converting the gradation of the image data on the basis of the determined gradation conversion characteristic.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an embodiment of the present invention will be described with reference to the drawings.

Figure 1:
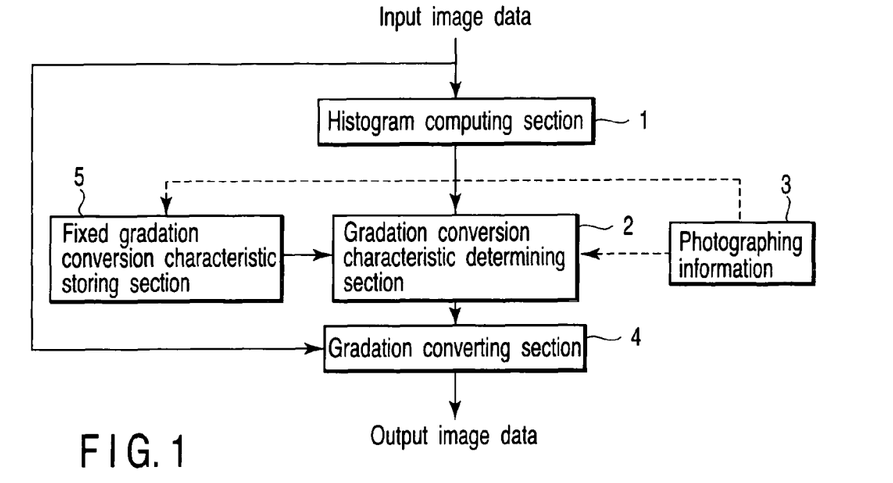
FIG. 1 is a diagram showing a conceptual constitution of an image processing apparatus according to an embodiment of the present invention.

FIG. 1 is a diagram showing a conceptual constitution of an image processing apparatus according to an embodiment of the present invention.

The image processing apparatus of FIG. 1 is made up of a histogram computing section 1, a gradation conversion characteristic determining section 2, a gradation converting section 4, and a fixed gradation conversion characteristic storing section 5. The histogram computing section 1 computes a histogram of pixel values of input image data. As the histogram, a histogram only for the brightness component of the image data (brightness histogram) may be computed, or a histogram for each color component of the image data may be computed.

After the histogram computing section 1 computes a histogram, the computed histogram is input to the gradation conversion characteristic determining section 2. The gradation conversion characteristic determining section 2 synthesizes the histogram computed by the histogram computing section 1, and a fixed gradation conversion characteristic stored in the fixed gradation conversion characteristic storing section 5, on the basis of photographing information 3 in a case where the image is picked up, to determine a gradation conversion characteristic. On the gradation conversion characteristic determined by the gradation conversion characteristic determining section 2, the gradation converting section 4 applies gradation conversion processing to the input image data, and then outputs the result to the outside. The fixed gradation conversion characteristic may have a fixed characteristic and may be uniformly applicable to the input image data.

Figure 2:
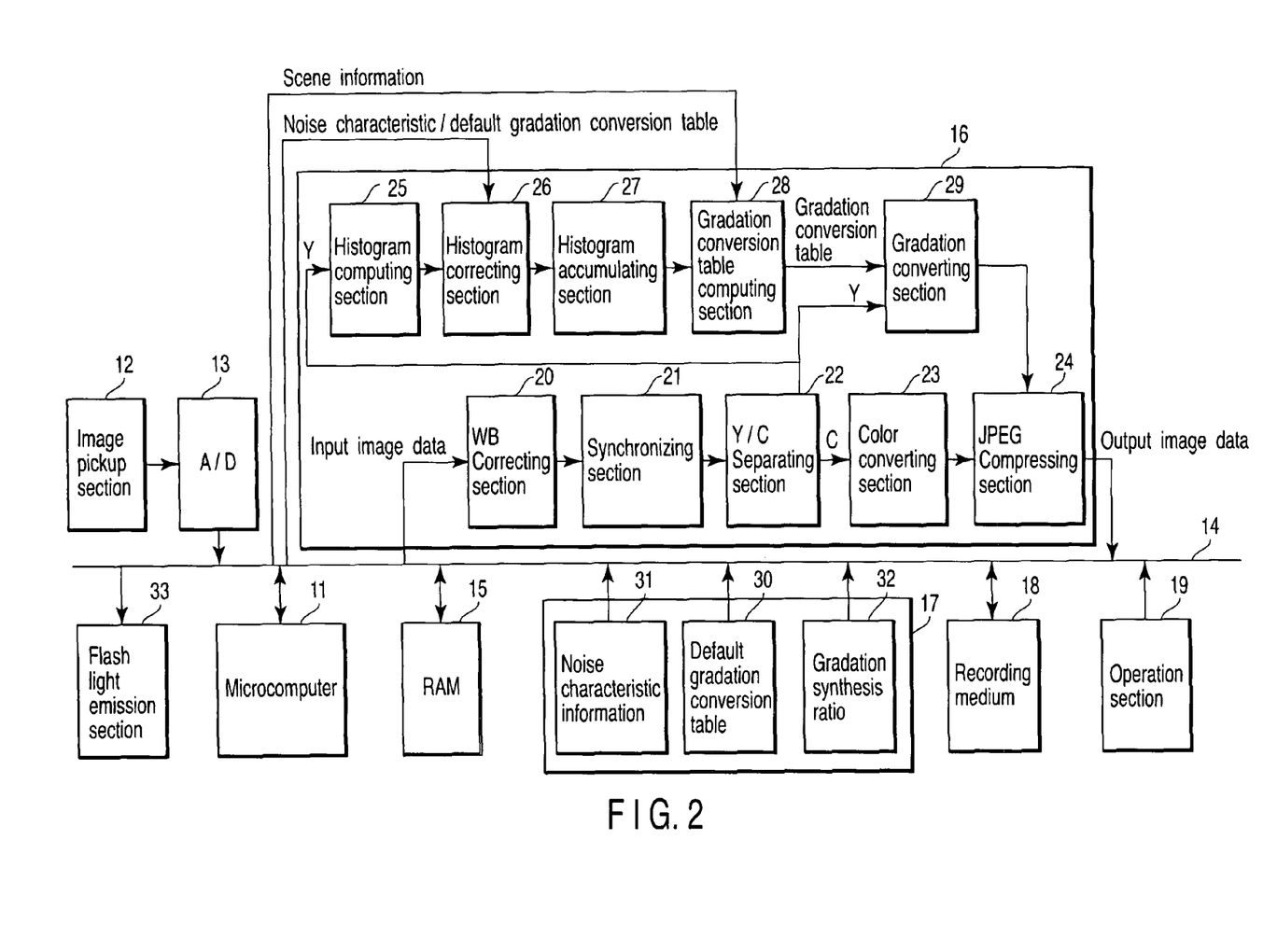
FIG. 2 is a block diagram showing a constitution of a digital camera as an example of an image recording apparatus including the image processing apparatus according to the embodiment of the present invention.

Hereinafter, the image processing apparatus of FIG. 1 will be described more specifically. FIG. 2 is a block diagram showing a constitution of a digital camera (hereinafter referred to as camera) as an example of an image recording apparatus including the image processing apparatus according to the embodiment of the present invention.

The digital camera of FIG. 2 includes a microcomputer 11, an image pickup section 12, an analog-to-digital converter (shown as A/D in FIG. 2) 13, a bus 14, a RAM 15, an image processing circuit 16, a ROM 17, a recording medium 18, an operation section 19, and a flash light emission section 33.

The microcomputer 11 is a controller for the entire control of the camera. The microcomputer 11 makes focus control of an image pickup optical system in the image pickup section 12; exposure control of an image pickup device in the image pickup section 12; recording control when image data is recorded on the recording medium 18; and so on.

The image pickup section 12 includes the above image pickup optical system, the above image pickup device, and drivers for them. The image pickup section 12 converts light rays entering from a not-shown subject through the image pickup optical system, into an electric signal. The analog-to-digital converter 13 converts the electric signal obtained by the image pickup section 12, into digital data to generate image data.

The bus 14 is a transfer path for transferring data, such as the image data obtained by the analog-to-digital converter 13, to each circuit in the camera. The RAM 15 is a memory for temporarily storing data such as the image data.

The image processing circuit 16 is a circuit for applying image processing to the input image data input through the bus 14. The image processing circuit 16 includes a white balance (WB) correcting section 20, a synchronizing section 21, a Y/C separating section 22, a color converting section 23, a JPEG compressing section 24, a histogram computing section 25, a histogram correcting section 26, a histogram accumulating section 27, a gradation conversion table computing section 28, and a gradation converting section 29. The above-described gradation conversion characteristic determining section 2 corresponds to the histogram correcting section 26, histogram accumulating section 27, and gradation conversion table computing section 28.

The ROM 17, as the fixed gradation conversion characteristic storing section and a synthesis ratio storing section, is a memory for storing various control programs to be executed by the microcomputer 11, and various set values for the camera. In this embodiment, the ROM 17 stores a default gradation conversion table 30 therein, noise characteristic information 31, and gradation synthesis ratios 32.

Figure 3:
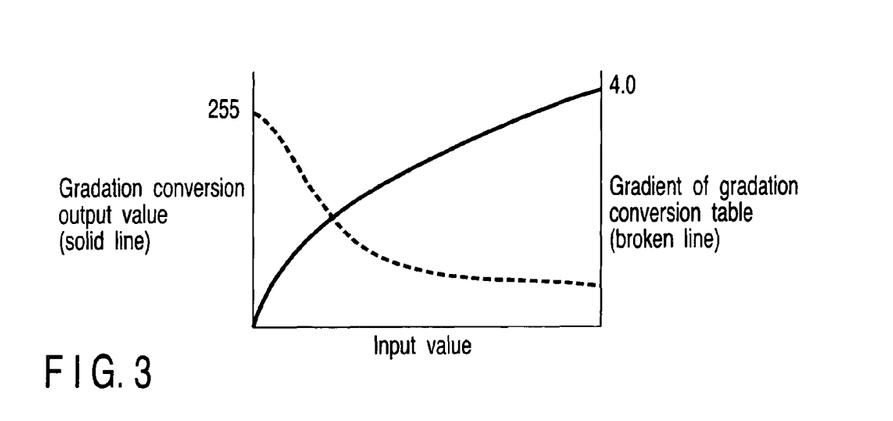
FIG. 3 is a graph showing an example of a default gradation conversion table.

The default gradation conversion table 30 is a gradation conversion table containing a standard characteristic stored in the ROM 17 as a characteristic fixed for each camera. The solid line in FIG. 3 represents an example of the default gradation conversion table 30. The abscissa of FIG. 3 represents image input values. The image input values of FIG. 3 are pixel values of image data input from the analog-to-digital converter 13. The ordinate of FIG. 3 represents output values (eight-bits output) after gradation conversion. The number of default gradation conversion tables stored in the ROM 17 is not limited to one. For example, the ROM 17 may store a plurality of default gradation conversion tables different from each other so that a user can arbitrarily select one of them. Alternatively, of a plurality of default gradation conversion tables stored, the optimum gradation conversion may be automatically selected in accordance with image pickup conditions.

Figure 4:
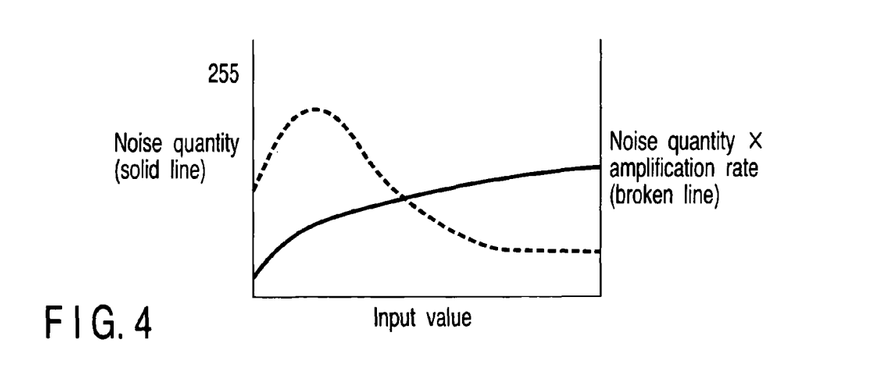
FIG. 4 is a graph showing an example of noise characteristic information.

The noise characteristic information 31 is information on the noise characteristic, which indicates what degree of noise is added in what form when an image is picked up. The noise characteristic information 31 is also information stored in the ROM 17 as fixed values. The solid line of FIG. 4 represents such noise characteristic information 31. The abscissa of FIG. 4 represents input values. The input values of FIG. 4 are input values from the analog-to-digital converter 13, like FIG. 3. The ordinate of FIG. 4 represents the quantity of noise. As shown in FIG. 4, as the input value increases, the quantity of noise increases accordingly. In FIG. 4, although there is noise when the input value is zero, it is caused by a dark current component.

The noise characteristic information 31 is constituted by values that vary in accordance with the image pickup sensitivity, temperature, exposure time, etc., of the image pickup section 12 upon image pickup. For example, when the image pickup sensitivity is high upon image pickup, the quantity of noise increases. For this reason, the ROM 17 may store a plurality of pieces of noise characteristic information to correspond to variations of the image pickup sensitivity, temperature, and exposure time, so that noise characteristic information can be read which corresponds to the image pickup sensitivity, temperature, and exposure time at the time when image data is picked up.

In addition, in recent cameras, cameras have been proposed that have a noise reduction processing function for reducing noise on an image upon image pickup. Therefore, in accordance with that, the ROM 17 may store noise characteristic information in a state wherein noise reduction processing has been applied.

Figure 5:
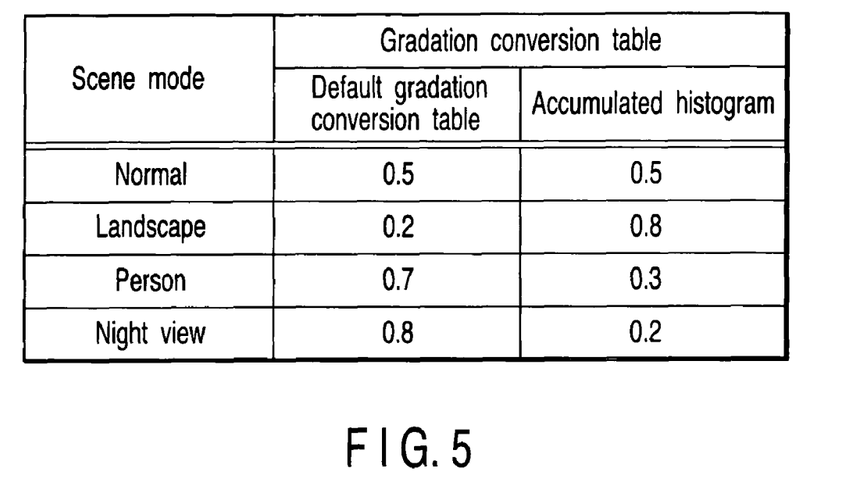
FIG. 5 shows gradation synthesis ratios by way of example.

The gradation synthesis ratios 32 are synthesis ratios when the default gradation conversion table 30 is synthesized with an accumulated histogram as will be described later. FIG. 5 shows the gradation synthesis ratios 32 by way of example. As shown in FIG. 5, values corresponding to scene modes are stored as the gradation synthesis ratios 32. Such a scene mode is one of the photographing modes for photographing in various settings, and a mode capable of setting a scene upon photographing. By setting such a scene mode, set values suitable for each scene are automatically selected for exposure control and so on. In this embodiment, as the gradation synthesis ratios corresponding to scene modes, the ROM 17 stores therein, for example, a normal mode for photographing in normal settings; a landscape mode for photographing in settings suitable for landscape photographing; a person mode for photographing in settings suitable for person photographing; and a night view mode for photographing in settings suitable for night view photographing. However, the gradation synthesis ratios are not limited to these.

The recording medium 18 is for recording thereon an image processed by the image processing circuit 16. The recording medium 18 is made of, for example, a memory card.

The operation section 19 is constituted by various operation members to be operated by a user. When the user operates the operation section 19, the microcomputer 11 makes various controls in accordance with the operation states. The operation section 19 includes, for example, a release button for instructing the camera to execute photographing; a selection button for selecting a scene mode; and so on.

The flash light emission section 33 is a light emission section for lighting for exposure assistance in the case of a dark scene, a backlit scene, or the like. Lighting by the flash light emission section 33 is controlled by the microcomputer 11.

Figure 6:
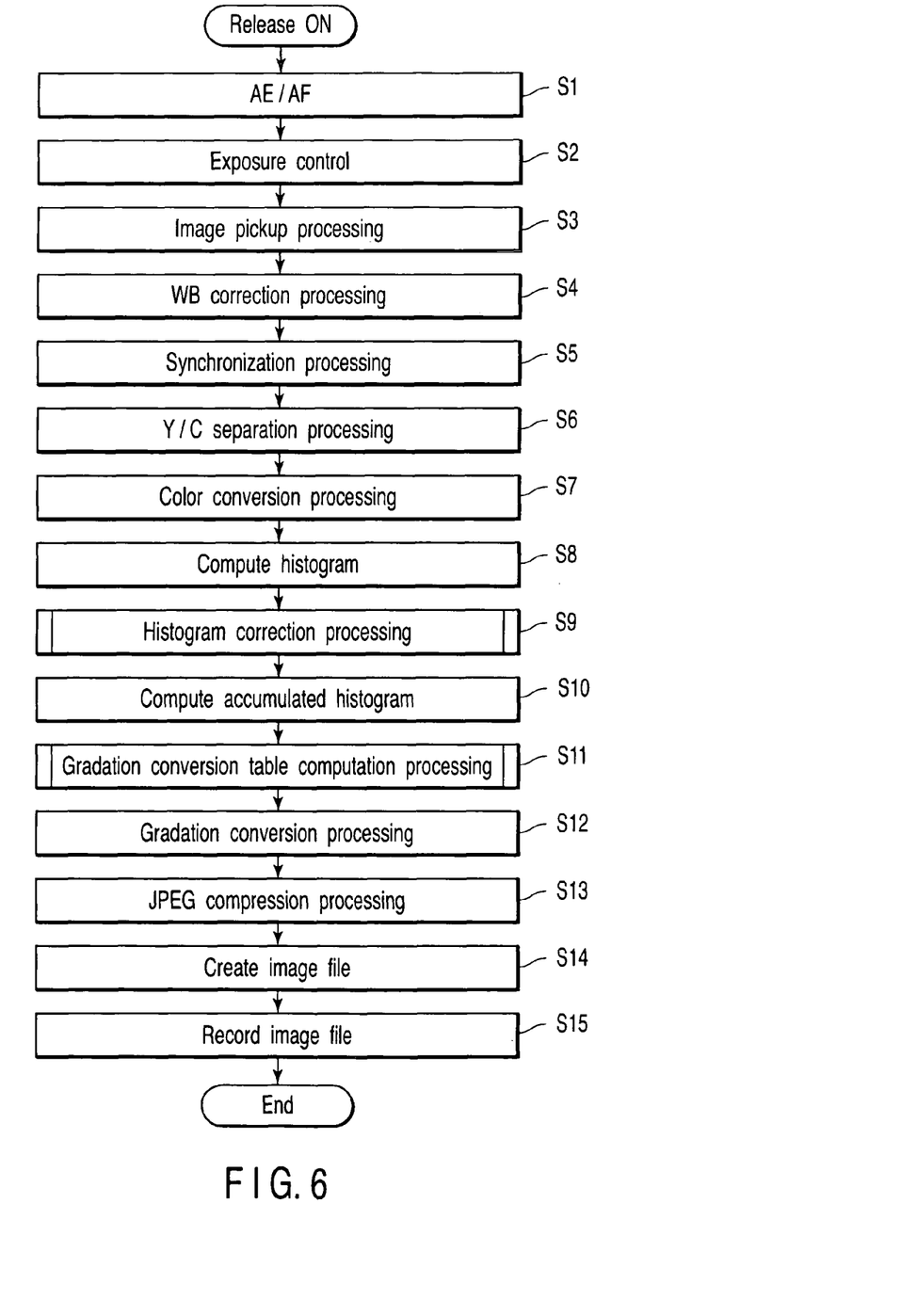
FIG. 6 is a flowchart showing photographing control including an image processing method according to an embodiment of the present invention.

Next, photographing control of the camera having the constitution as shown in FIG. 2 will be described with reference to FIG. 6. FIG. 6 is a flowchart showing photographing control including an image processing method according to an embodiment of the present invention. The flow of FIG. 6 is started by an ON operation of the release button by a user.

When the user operates the release button into an ON state, known AE and AF operations are performed on the basis of the output of the image pickup section 12 (Step S1). Afterward, exposure control is made (Step S2), and an image signal for recording is obtained in the image pickup section 12. Afterward, image pickup processing for the image signal for recording, obtained in the image pickup section 12, is performed (Step S3). In this image pickup process, the image signal obtained in the image pickup section 12 is converted into a digital signal by the analog-to-digital converter 13. Image data is thereby obtained. The image data obtained in the analog-to-digital converter 13 is input to the WB correcting section 20 of the image processing circuit 16.

The WB correcting section 20 performs white balance correction for the image data (Step S4). In the white balance correction, the R and B components of the input image data are corrected so that white of the image data input to the WB correcting section 20 is proper. The image data having been subjected to the white balance correction in the WB correcting section 20 is input to the synchronizing section 21.

The synchronizing section 21 performs synchronization processing (Step S5). In the synchronization process, image data in which one pixel component is constituted by three colors of R, G, and B, is generated by interpolation from the image data input to the synchronizing section 21. The image data having been subjected to the synchronization process in the synchronizing section 21 is input to the Y/C separating section 22.

The Y/C separating section 22 performs Y/C separation processing (Step S6). In the Y/C separation process, the input image data is divided into a Y (brightness) signal and a C (color) signal. Of the separated signals, the Y signal is input to the histogram computing section 25 and the gradation converting section 29, and the C signal is input to the color converting section 23.

The color converting section 23 performs color conversion processing (Step S7). In the color conversion process, the C signal input to the color converting section 23 is converted into a standard color signal such as sRGB in a camera or the like. The signal having been converted in color in the color converting section 23 is input to the JPEG compressing section 24.

Figure 7:
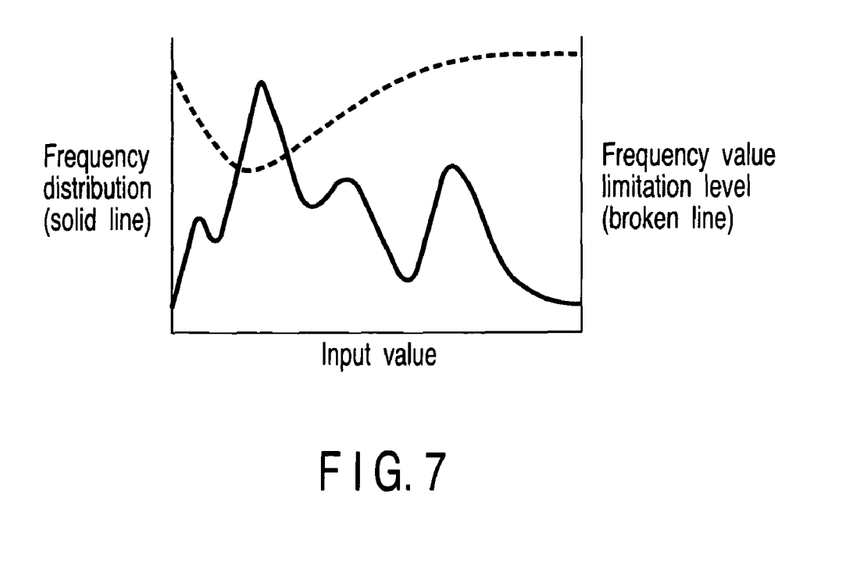
FIG. 7 is a graph showing an example of a histogram.

The histogram computing section 25 performs histogram computation processing (Step S8). In the histogram computation process, a histogram (brightness histogram) is computed by the frequency value of each brightness input of the Y signal input to the histogram computing section 25. The solid line of FIG. 7 represents an example of a histogram computed by the histogram computing section 25. The abscissa of FIG. 7 represents brightness input values. The ordinate of FIG. 7 represents brightness distribution, that is, frequency values of brightness input. The histogram computed by the histogram computing section 25 is input to the histogram correcting section 26.

In this embodiment, the histogram is computed from the brightness component of the image data. In a modification, however, a histogram of the color component of the image data may be computed. In this case, the histograms of all of three colors of R, G, and B may be computed, or only the histogram of the G component may be computed.

The histogram correcting section 26 performs histogram correction processing (Step S9). In the histogram correction process, the histogram computed by the histogram computing section 25 is corrected on the basis of noise characteristic information 31 stored in the ROM 17.

Figure 8:
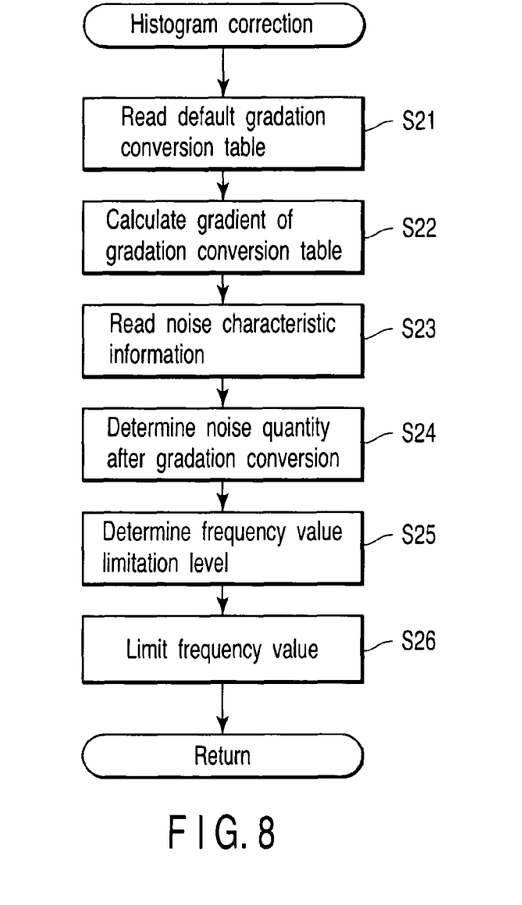
FIG. 8 is a flowchart showing histogram correction processing.

The histogram correction process will be described with reference to FIG. 8. In the histogram correction process, first, the default gradation conversion table 30 stored in the ROM 17 is read (Step S21). Next, the gradient of the default gradation conversion table 30 is calculated (Step S22). The gradient of the default gradation conversion table 30 can be obtained by, for example, differentiating the default gradation conversion table 30. For example, in the case of the default gradation conversion table 30 shown by the solid line in FIG. 3, the gradient is shown by the broken line in FIG. 3.

After the gradient of the default gradation conversion table 30 is calculated, noise characteristic information 31 stored in the ROM 17 is read (Step S23). Next, a noise quantity after gradation conversion is estimated (Step S24). The noise quantity after gradation conversion is the product of a noise quantity and the amplification rate of noise after gradation conversion. The amplification rate of noise after gradation conversion is represented by the gradient of the default gradation conversion table 30 calculated in Step S22. Thus, the noise quantity after gradation conversion is the product of the noise quantity shown by the solid line in FIG. 4 and the gradient of the default gradation conversion table shown by the broken line in FIG. 3. Consequently, the estimated noise quantity after gradation conversion is as shown by the broken line in FIG. 4. As shown by the broken line in FIG. 4, after gradation conversion, a peak of the noise quantity exists at a dark portion in the original image. This is because the gradation conversion brings about extension of the dark portion in the original image and compression of the bright portion in the original image.

After the noise quantity after gradation conversion is estimated, a frequency value limitation level for the histogram is determined for correcting the histogram (Step S25). In this embodiment, the frequency value limitation level for the histogram is determined so that noise after gradation conversion becomes inconspicuous. For this purpose, the reciprocal of the noise quantity after gradation conversion is calculated. The broken line of FIG. 7 represents the frequency value limitation level. As shown in FIG. 7, the frequency value limitation level is set at a high value where the noise quantity after gradation conversion is large. Although the frequency value limitation level for the histogram is the reciprocal of the noise quantity after gradation conversion in this embodiment, for example, a more adequate frequency value limitation level may be obtained by a predetermined operation after the calculation of the reciprocal.

Figure 9:
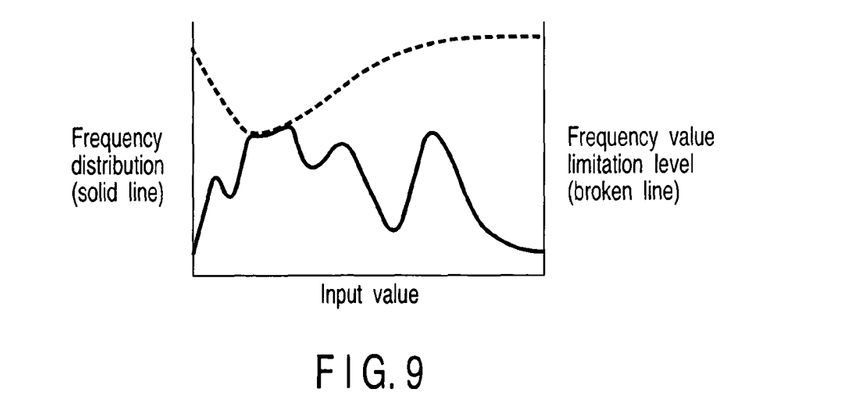
FIG. 9 is a graph showing the histogram after frequency value limitation.

After the frequency value limitation level is determined, the portion of the histogram exceeding the frequency value limitation level is limited as shown in FIG. 9 (Step S26). By gradation conversion using the histogram thus corrected, noise after the gradation conversion becomes inconspicuous.

Figure 10:
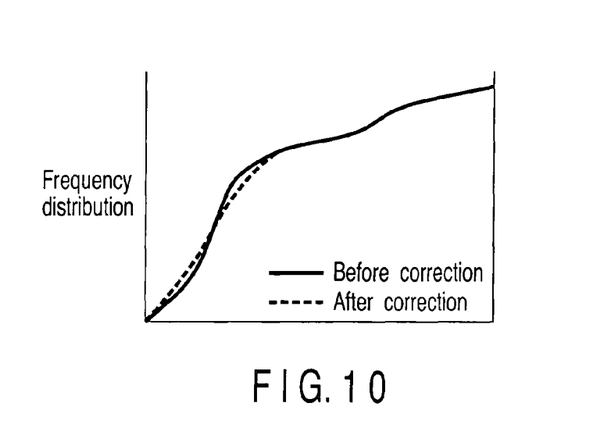
FIG. 10 is a graph showing an example of an accumulated histogram.

Referring back to FIG. 6, the histogram corrected by the histogram correcting section 26 is input to the histogram accumulating section 27. The histogram accumulating section 27 performs histogram accumulation processing (Step S10). In the histogram accumulation process, the histogram input to the histogram accumulating section 27 is accumulated in order from its low brightness component side. FIG. 10 shows an example of an accumulated histogram. The solid line in FIG. 10 represents an accumulated histogram before the histogram correcting section 26 corrects the histogram. The broken line in FIG. 10 represents an accumulated histogram after the histogram correcting section 26 corrects the histogram. But, the accumulated histogram after the histogram correction is normalized so that its maximum value of accumulated frequency (corresponding to the amount of frequencies) is equal to the maximum value of accumulated frequency before the histogram correction. In the accumulated histogram after the histogram correction, the gradient of the portion where the noise quantity increases after gradation conversion is gentle in comparison with the accumulated histogram before the histogram correction.

The accumulated histogram obtained by the histogram accumulating section 27 is input to the gradation conversion table computing section 28. The gradation conversion table computing section 28 performs gradation conversion table computation processing (Step S11).

Figure 11:
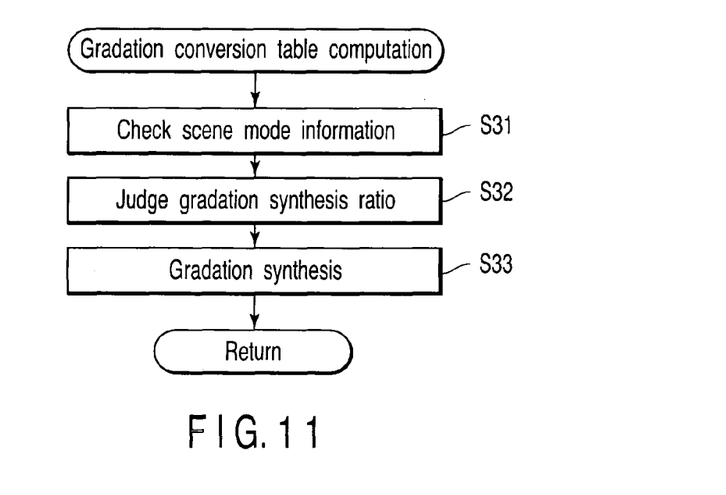
FIG. 11 is a flowchart showing gradation conversion table calculation processing.

The gradation conversion table computation process will be described with reference to FIG. 11. In the gradation conversion table computation process, the accumulated histogram obtained by the histogram accumulating section 27 and the default gradation conversion table 30 stored in the ROM 17 are synthesized at a predetermined synthesis ratio to compute a gradation conversion table. In FIG. 11, first, scene mode information upon photographing is checked (Step S31). Next, in accordance with the scene mode information checked in Step S31, it is judged which of gradation synthesis ratios stored in the ROM 17 should be selected (Step S32). Next, according to the judged gradation synthesis ratio, the default gradation conversion table 30 and the accumulated histogram are synthesized (Step S33).

Figure 12:
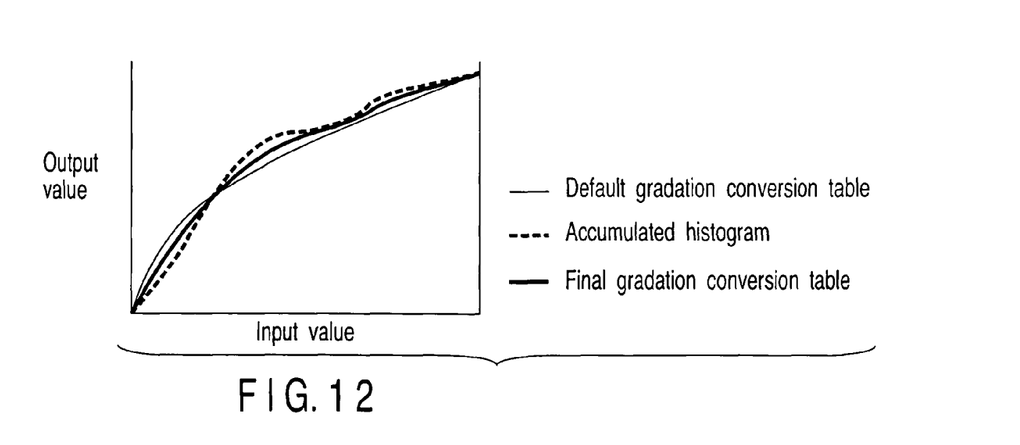
FIG. 12 is a graph showing an example of synthesis of the default gradation conversion table and an accumulated histogram.

FIG. 12 shows an example of synthesis of the default gradation conversion table 30 and the accumulated histogram. The thin solid line of FIG. 12 represents the default gradation conversion table; the broken line of FIG. 12 represents the accumulated histogram; and the thick solid line represents the final gradation conversion table obtained after the synthesis. In the example of FIG. 12, the scene mode is the normal mode (gradation synthesis ratio 0.5:0.5). That is, in the example of FIG. 12, because the gradation synthesis ratio is 0.5:0.5, the gradation conversion table obtained after the synthesis is a mean value of the default gradation conversion table 30 and the accumulated histogram.

Although not shown in FIG. 12, in the case of photographing a subject high in contrast, such as a landscape, by making the ratio of the accumulated histogram higher, more proper gradation can be obtained. Conversely, in the case of photographing a person, because the contrast of the subject is always low, the default gradation conversion table is taken much account of in order that the contrast may not rise more than necessary. Further, in the case of a night view, the ratio of the default gradation conversion table is made higher in order that the naturally dark image does not become bright more than necessary. Alternatively in the case of a night view, the default gradation conversion table and the accumulated histogram may not be synthesized.

As for gradation synthesis ratios, the present invention is not limited to a case where only values corresponding to scene modes are stored. For example, in addition to the above gradation synthesis ratios, gradation synthesis ratios in accordance with settings, for example, with regard to presence/absence of flash and whether the exposure is made manually or automatically, may be also stored.

Figure 13A:
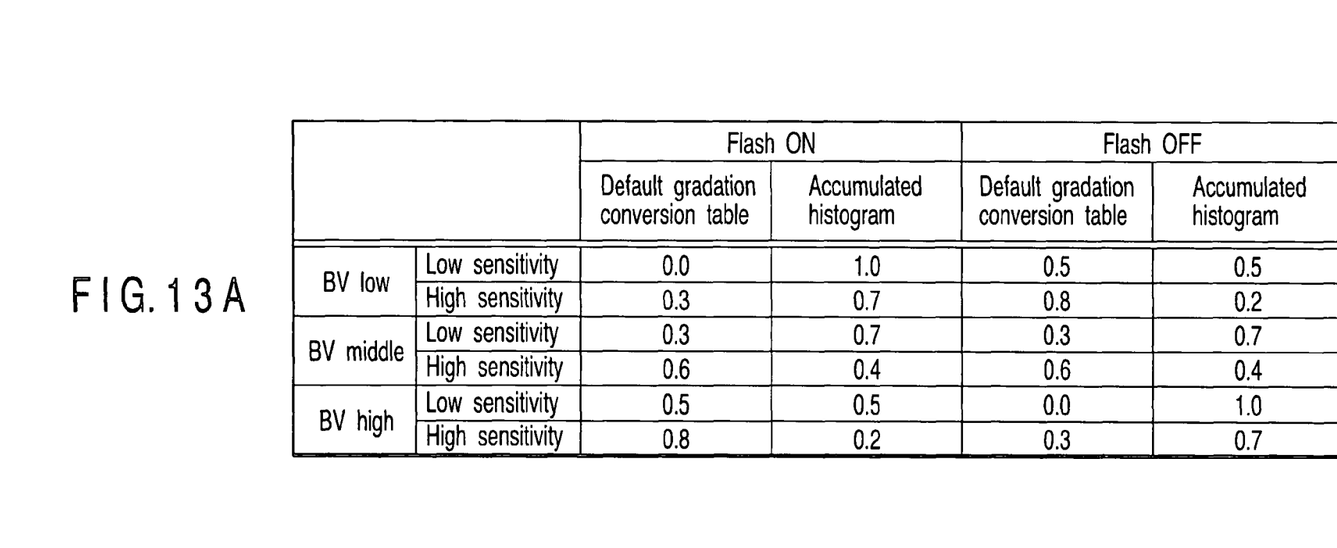
FIG. 13A shows gradation synthesis ratios in an automatic exposure mode by way of example.

FIG. 13A shows by way of example gradation synthesis ratios in an automatic exposure mode in which exposure is controlled automatically on the camera side. As shown in FIG. 13A, in the case of the automatic exposure mode, a gradation synthesis ratio is determined in accordance with the subject brightness (BV) upon photographing, image pickup sensitivity information on the image pickup section 12 upon photographing, and flash information indicating ON or OFF of light emission of the flash light emission section 33.

In FIG. 13A, for example, in the case that the flash light emission section 33 is ON in a state wherein the subject is in low brightness (BV low) and the image pickup sensitivity of the image pickup section 12 is set at low sensitivity, because the contrast of the image may become somewhat high, the ratio of the accumulated histogram is made higher in order that a dark portion of the image may not be blacked out. On the other hand, in the case that the flash light emission section 33 is ON in a state wherein the subject is in high brightness (BV high) and the image pickup sensitivity of the image pickup section 12 is set at low sensitivity, because there is possibility that the user operates the flash light emission section 33 for correcting backlight, the ratios of the default gradation conversion table and the accumulated histogram are set to substantially the same value. Further, in the case that the flash light emission section 33 is OFF in a state wherein the subject is in low brightness and the image pickup sensitivity of the image pickup section 12 is set at low sensitivity, because there is possibility that the user has intentionally set the flash light emission section 33 OFF, the ratios of the default gradation conversion table and the accumulated histogram are set to substantially the same value. Further, in the case that the flash light emission section 33 is OFF in a state wherein the subject is in high brightness and the image pickup sensitivity of the image pickup section 12 is set at low sensitivity, the ratio of the accumulated histogram is made higher in order that more proper gradation can be obtained. Further, in the case that the image pickup sensitivity of the image pickup section 12 is set at high sensitivity, because the image may become bright on the whole, the ratio of the accumulated histogram is made lower than that in the case of low sensitivity in order that the dark portion of the image may not become bright more than necessary.

Figure 13B:
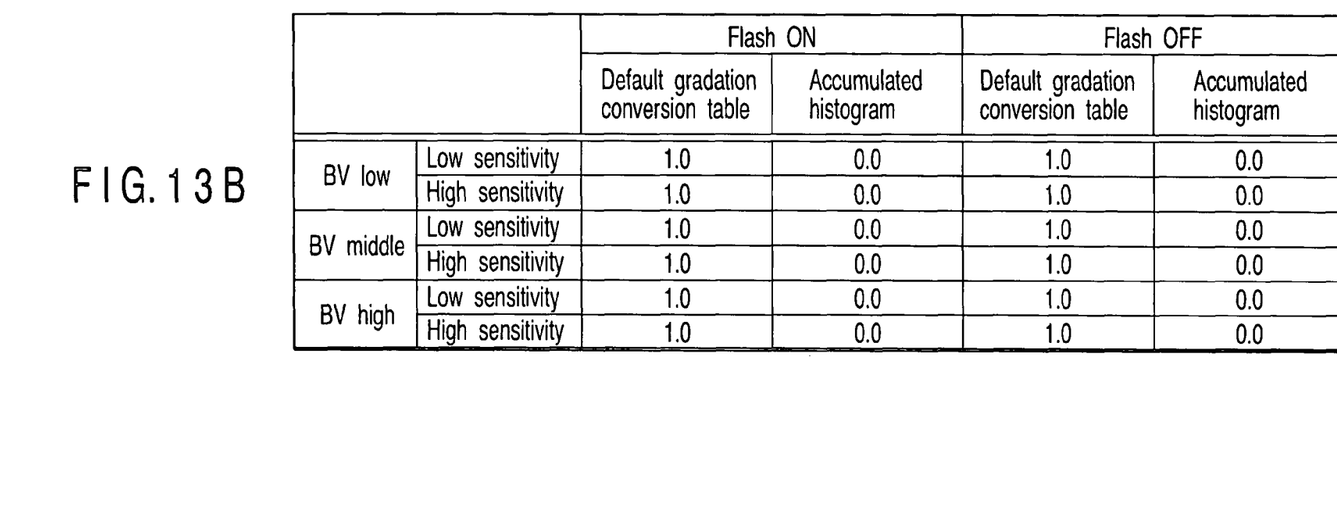
FIG. 13B shows gradation synthesis ratios in a manual exposure mode by way of example.

FIG. 13B shows by way of example gradation synthesis ratios in a manual exposure mode in which exposure is manually controlled. As shown in FIG. 13B, in the manual exposure mode, in order to fully reflect the imaging intention of the user, the accumulated histogram is not synthesized and only the default gradation conversion table is used.

In gradation synthesis, the synthesis may be made with changing the default gradation conversion table in accordance with photographing conditions in a state of a fixed gradation synthesis ratio (gradation synthesis ratio=0.5:0.5).

Figure 14A:
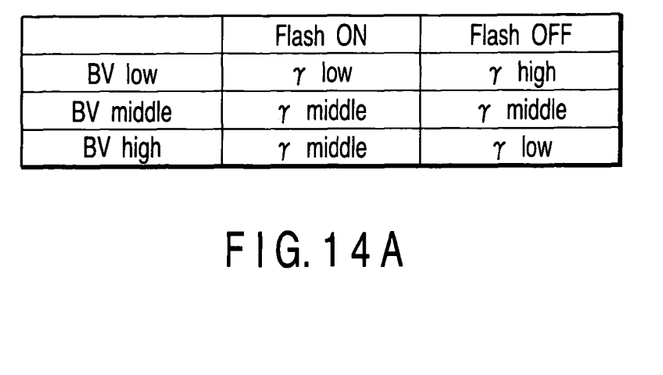
FIG. 14A shows an example of a selection table for the default gradation conversion table in the automatic exposure mode.
Figure 15:
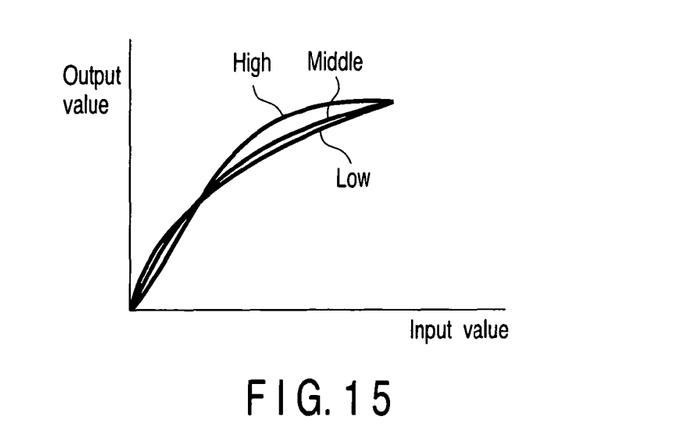
FIG. 15 is a graph showing default gradation conversion tables for different γ values.

FIG. 14A shows an example of a selection table for the default gradation conversion table in the automatic exposure mode. As shown in FIG. 14A, the default gradation conversion table in the automatic exposure mode is determined in accordance with the subject brightness (BV) upon photographing and flash information indicating ON or OFF of operating the flash light emission section 33. In FIG. 14, γ represents a γ value in the default gradation conversion table. FIG. 15 shows by way of example a default gradation conversion table lower in γ value than the normal default gradation conversion table (shown as middle in FIG. 15), and a default gradation conversion table higher in γ value than the normal default gradation conversion table. As shown in FIG. 15, the gradation conversion tables have a tendency that the contrast of the image after gradation conversion rises as the γ value rises.

In FIG. 14A, for example, in the case that the flash light emission section 33 is ON in a state wherein the subject is in low brightness, because the contrast of the image may become somewhat high, a default gradation conversion table low in γ value is selected in order that a dark portion of the image may not be blacked out. On the other hand, in the case that flash light emission section 33 is ON in a state wherein the subject is in high brightness, because there is possibility that the user operates the flash light emission section 33 for correcting backlight, the default gradation conversion table normal in γ value is selected. Further, in the case that the flash light emission section 33 is OFF in a state wherein the subject is in low brightness, a default gradation conversion table high in γ value is selected in order to raise the contrast of the image. Otherwise, the default gradation conversion table normal in γ value may be selected. Further, in the case that the flash light emission section 33 is OFF in a state wherein the subject is in high brightness, a default gradation conversion table low in γ value is selected in order that more proper gradation can be obtained.

Figure 14B:
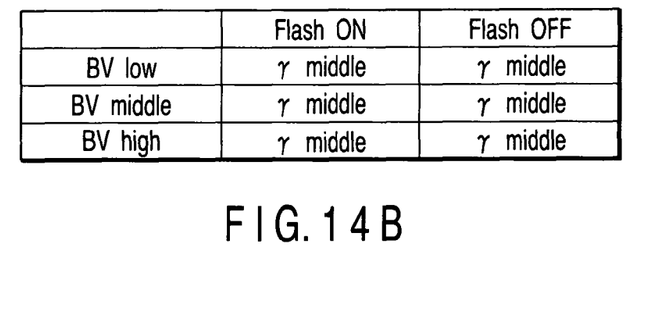
FIG. 14B shows an example of a selection table for the default gradation conversion table in the manual exposure mode.

FIG. 14B shows an example of a selection table for the default gradation conversion table in the manual exposure mode. As shown in FIG. 14B, in the manual exposure mode, in order to fully reflect the imaging intention of the user, the default gradation conversion table normal in γ value is selected.

Referring back again to FIG. 6, the gradation conversion table calculated by the gradation conversion table calculating section 28 is input to the gradation converting section 29. The gradation converting section 29 performs gradation conversion processing (Step S12). In the gradation conversion process, the Y signal input from the Y/C separating section 22 is subjected to gradation conversion on the basis of the gradation conversion table input from the gradation conversion table calculating section 28. The Y signal having been subjected to the gradation conversion is input to the JPEG compressing section 24.

The JPEG compressing section 24 performs JPEG compression of the Y signal having been subjected to the gradation conversion, and the C signal having been subjected to color conversion (Step S13). Afterward, header information such as the above-described photographing information is added to the JPEG-compressed data to make an image file (Step S14), and then the made image file is recorded on a recording medium 18 (Step S15). The photographing control thus ends. By recording photographing information also in the header information of the image file, the gradation conversion process as described in this embodiment can be performed also in a subsequent process.

As described above, according to the embodiment of the present invention, the scene information upon photographing can be reflected when a gradation conversion table is calculated in the gradation conversion process. Therefore, the gradation conversion process most suitable for the photographed scene can be performed.

In the above embodiment, only the case of photographing an image has been described, but the technique of the present invention can also be applied to a case of reproducing an image. Furthermore, in the above embodiment, the case where the same gradation conversion process is performed in one picture has been described, but one picture may be divided into a plurality of regions and a gradation conversion table may be calculated under different conditions for each of the divided regions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image processing apparatus comprising;
a histogram computing section which computes a histogram of pixel values of input image data;
a gradation conversion characteristic determining section which determines a gradation conversion characteristic in a case where gradation conversion processing is applied to the input image data, on the basis of the histogram computed by the histogram computing section and information on noise characteristics which indicates what degree of noise is added, and in what form, when the input image data has been picked up; and
a gradation converting section which converts the gradation of the input image data on the basis of the gradation conversion characteristic determined by the gradation conversion characteristic determining section,
wherein the gradation conversion characteristic determining section further comprises a histogram correction section which, when determining the gradation conversion characteristic, calculates a reciprocal number of a noise quantity after gradation conversion from a default gradation conversion characteristic using the information on noise characteristics, and corrects a portion of a frequency value in the histogram which exceeds the reciprocal number of the noise quantity after the gradation conversion to be limited to the reciprocal number of the noise quantity after the gradation conversion, and
wherein the information on the noise characteristics includes the noise quantity which varies in accordance with an image pickup sensitivity, a temperature or an exposure time when the input image data has been picked up.

2. The image processing apparatus according to claim 1, further including a noise characteristic storing section which stores information on noise characteristic of the input image data,
wherein the gradation conversion characteristic determining section reads the information on the noise characteristics when the input image data has been picked up from the noise characteristic storing section in accordance with the image pickup sensitivity, the temperature, or the exposure time at the time of photographing, and corrects the portion of the frequency value in the histogram which exceeds the reciprocal number of the noise quantity after the gradation conversion to be limited on the basis of the read information on the noise characteristic during the correction of the histogram.

3. The image processing apparatus according to claim 2, further including a fixed gradation conversion characteristic storing section which stores at least one fixed gradation conversion characteristic having a fixed characteristic and uniformly applicable to the input image data,
wherein the gradation conversion characteristic determining section, during the correction of the histogram, further
obtains a gradient of the fixed gradation conversion characteristics read from the fixed gradation conversion characteristics storing section,
obtains a noise quantity after the gradation conversion from a product of the noise quantity which is the information on the noise characteristic read from the noise characteristics storing section, and the obtained gradient of the fixed gradation conversion characteristic, and further a reciprocal number of the noise quantity after the gradation conversion, and
determines the reciprocal number of the noise quantity after the conversion as a quantity of limitation of the frequency value.

4. An image processing apparatus comprising:
a histogram computing section which computes a histogram of pixel values of input image data;
a fixed gradation conversion characteristic storing section which stores at least one fixed gradation conversion characteristic having a fixed characteristic and uniformly applicable to the input image data;
a gradation conversion characteristic determining section which determines the fixed gradation conversion characteristic in a case where gradation conversion processing is applied to the input image data by deriving a cumulative histogram from the histogram computed by the histogram computing section, and by synthesizing the cumulative histogram derived and the fixed gradation conversion characteristic stored in the fixed gradation conversion characteristics storing section on the basis of information indicating a scene when the input image data has been picked up;
a synthesis ratio storing section which stores a plurality of synthesis ratios to be used for the synthesis while associating with the information indicating the scene; and
a gradation converting section which converts the gradation of the input image data on the basis of the gradation conversion characteristic determined by the gradation conversion characteristic determining section,
wherein the gradation conversion characteristic determining section which determines a synthesis ratio to be used for the synthesis from the plurality of synthesis ratios stores in the synthesis ratio storing section on the basis of the information on the scene when the input image data has been picked up, and
wherein the information indicating the scene includes at least one of information indicating a scene when the input image data has been picked up, flash information indicating whether or not a flash has been lit when the input image data has been picked up, information indicating whether or not the input image data has been picked up by automatic exposure, and photographing sensitivity information when the input image data has been picked up.

5. The image processing apparatus according to claim 4, wherein the information indicating the scene when the input image data has been picked up includes information designated by an operation of an operation member by a photographer.

6. The image processing apparatus according to claim 1, wherein the information on noise characteristics are stored in a ROM as fixed values.

7. The image processing apparatus according to claim 1, wherein the information on noise characteristics are constituted by values that vary in accordance with an image pickup sensitivity.

8. The image processing apparatus according to claim 1, wherein the information on noise characteristics are constituted by values that vary in accordance with a temperature.

9. The image processing apparatus according to claim 1, wherein the information on noise characteristics are constituted by values that vary in accordance with an exposure time.

10. The image processing apparatus according to claim 1, wherein the information on noise characteristics which are used to correct the histogram includes image pickup sensitivity of an image pickup section.

11. An image processing apparatus for applying a gradation conversion processing, the apparatus comprising:
a histogram computing section which computes a histogram of pixel values of input image data;
a memory storing a default gradation conversion table containing a standard characteristic, and an information on noise characteristic indicating what degree of noise is added, and in what form, when the input image data is picked up;
a histogram correction section performing following steps:
reading the default gradation conversion table stored in the memory;
calculating a gradient of the default gradation conversion table by differentiating the default gradation conversion table;
reading the information on noise characteristic which is a noise quantity, stored in the memory;
estimating a noise quantity after the gradation conversion, which is a product of noise quantity and an amplification rate of noise after the gradation conversion, wherein the amplification rate of noise after gradation conversion is represented by the calculated gradient of the default gradation conversion table;
calculating a reciprocal number of the noise quantity after the gradation conversion and determining the calculated reciprocal number as a frequency value limitation level to correct the histogram; and
limiting a portion of the histogram exceeding the frequency value limitation level, thereby correcting the histogram;
a histogram accumulating section which performs histogram accumulating process using the corrected histogram by the histogram accumulating section and obtaining an accumulated histogram;
a gradation conversion table computing section computing a final gradation conversion table on the basis of the accumulated histogram obtained by the histogram accumulating section; and
a gradation converting section performing the gradation conversion processing using the final gradation conversion table computed by the gradation conversion table computing section.

12. The image processing apparatus according to claim 11, said noise characteristic information is stored in a noise characteristic storing section of the memory as fixed values.

13. The image processing apparatus according to claim 11, wherein the noise characteristic information is constituted by values that vary in accordance with an image pickup sensitivity.

14. The image processing apparatus according to claim 11, wherein the noise characteristic information is constituted by values that vary in accordance with a temperature.

15. The image processing apparatus according to claim 11, wherein the noise characteristic information is constituted by values that vary in accordance with an exposure time.

16. An image processing method for applying a gradation conversion processing, the method comprising:
computing a histogram of pixel values of input image data by a histogram computing section;
storing a default gradation conversion table containing a standard characteristic, information on noise characteristic indicating what degree of noise is added, and in what form, when the input image data is picked up in a memory;
performing following steps for a histogram correction by a histogram correction section:
reading the default gradation conversion table stored in the memory;
calculating a gradient of the default gradation conversion table by differentiating the default gradation conversion table;
reading the noise characteristic information which is a noise quantity, stored in the memory;
estimating a noise quantity after the gradation conversion, which is a product of the noise quantity and an amplification rate of noise after the gradation conversion, wherein the amplification rate of noise after gradation conversion is represented by the calculated gradient of the default gradation conversion table;
calculating a reciprocal number of the noise quantity after the gradation conversion and determining the calculated reciprocal number as a frequency value limitation level to correct the histogram; and
limiting a portion of the histogram exceeding the frequency value limitation level, thereby correcting the histogram;
performing a histogram accumulating process by inputting the corrected histogram to a histogram accumulating section, thereby obtaining an accumulated histogram;
computing a final gradation conversion table from the accumulated histogram obtained by the histogram accumulating section by storing a gradation conversion table computing section; and
performing a gradation conversion processing using the computed final gradation conversion table by a gradation converting section.

17. An image processing method for applying a gradation conversion processing, the method comprising:
performing following steps for an image processing circuit;
computing a histogram of pixel values of input image data by a histogram computing section;
storing a plurality of fixed gradation conversion characteristics each having a fixed characteristic and applicable to the input image data and a plurality of gradation synthesis ratios while associating with the information indicating the scene when the input image data is picked up;
deriving an accumulated histogram from the computed histogram by a histogram accumulating section;
reading the plurality of fixed gradation conversion characteristics and the plurality of gradation synthesis ratios in accordance with the information indicating the scene;
determining the gradation conversion characteristic in a case where gradation conversion processing is applied to the input image data by synthesizing the cumulative histogram derived and the fixed gradation conversion characteristic read from the memory on the basis of a gradation synthesis ratio read from the memory; and
converting the gradation of the input image data on the basis of the determined gradation conversion characteristic, wherein the information indicating the scene includes at least one of information indicating a scene when the input image data has been picked up, flash information indicating whether or not a flash has been lit when the input image data has been picked up, information indicating whether or not the input image data has been picked up by automatic exposure, and photographing sensitivity information when the input image data has been picked up.

18. The image processing method according to claim 17, wherein the information indicating the scene when the input image data has been picked up includes information designated by an operation of an operation member by a photographer.

* * * * *